July 23, 1963
G. F. SPRAGENS
3,098,506
VALVE PACKING ASSEMBLY
Filed Oct. 2, 1958
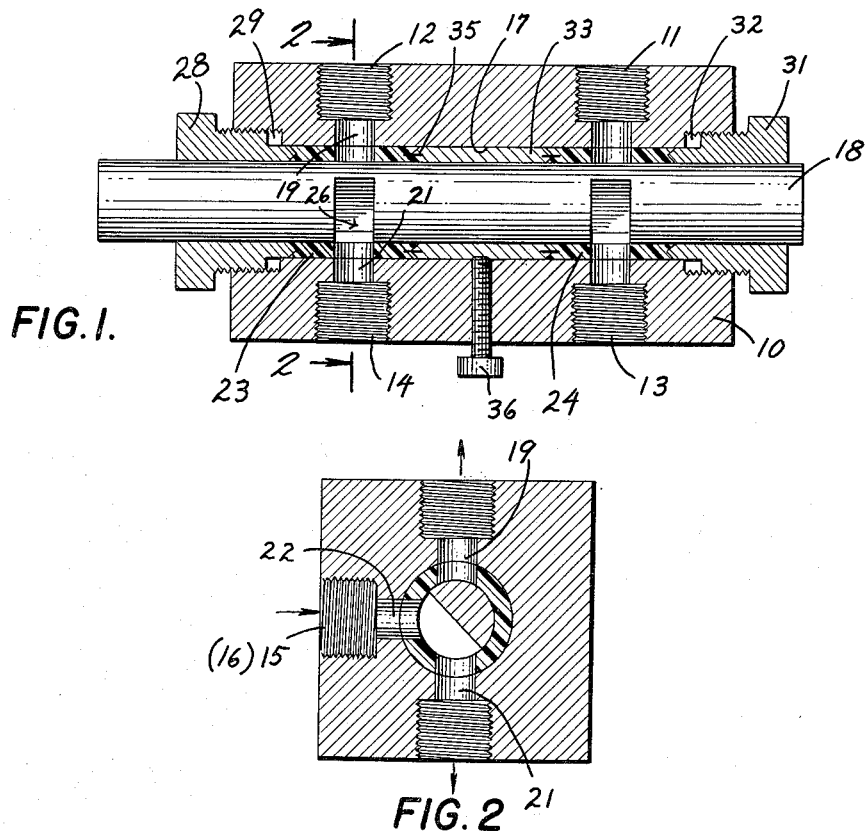
FIG. 1.
FIG. 2.
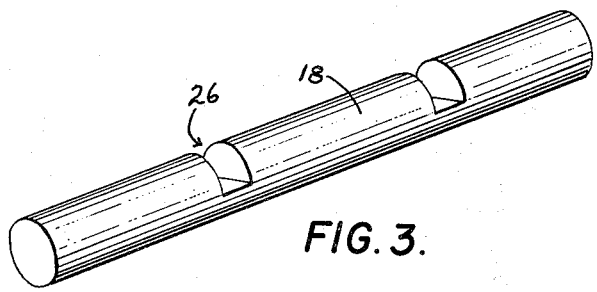
FIG. 3.
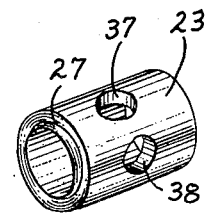
FIG. 4.
INVENTOR.
GEORGE F. SPRAGENS
BY
Brumbaugh, Free, Graves & Donohue
ATTORNEYS.

3,098,506
VALVE PACKING ASSEMBLY
George F. Spragens, Lyndon, Ky., assignor to The Martin Sweets Company, Louisville, Ky., a Kentucky proprietorship
Filed Oct. 2, 1958, Ser. No. 764,850
3 Claims. (Cl. 137—625.19)

This invention relates to a novel valve assembly of a type embodying a single actuator within a valve housing to control the flow of at least two components and characterized by dependability of operation, effective sealing and long life.

The valve assembly of the present invention is an improvement over conventional valves, for example, of the type used in mixing heads for foam blends, such as polyurethane. In one mixing head of this type, the valve assembly in one position of adjustment permits the separate components of the foam blend to be recirculated under pressure and in another position of adjustment directs the separate components to a mixing chamber within the head wherein the fluids are thoroughly blended by a blade-carrying rotor before the blend is discharged therefrom. This mixing head is described in detail in "Modern Plastics Encyclopedia Issue for 1959," September 1958, beginning on page 335. The valve assembly employed in this mixing head utilizes a rotatable plug having flow passages therein which establish communication between various passages in the mixing head. This rotatable plug type valve, however, has certain drawbacks. For example, in the production of polyurethane foam, the components which are blended to produce the foam have adhesive characteristics with the result that leakage thereof tends not only to make the actuation of the valve more difficult, but tends also to damage the valve and shorten its life expectancy.

The valve assembly of the present invention overcomes these disadvantages of conventional valves inasmuch as it affords a highly effective seal with the result that the valve is not only dependable in operation, but has a long life expectancy.

The valve assembly of the present invention comprises a housing which accommodates a movable actuator therein which is capable of controlling the flow of a liquid or liquids through at least two different sets of ports. An effective seal is maintained between the movable actuator and the housing by a pair of deformable sleeves which serve both as effective bearings for the actuator and as effective seals between the actuator and the housing. These deformable sleeves are separated by a relatively rigid intermediate member and the effectiveness of the seal afforded by the deformable sleeves is controlled by means which apply axial forces against the outer edges of the deformable sleeves, compressing each of the deformable sleeves against the intermediate rigid member while still serving as effective bearings for the common actuator arrangement.

The valve assembly of the present invention also includes means for connecting the two deformable sleeves with the intermediate member as a unitary assembly and means to prevent rotation of this assembly within the housing to prevent the deformable sleeves from coming out of registry with the passages in the housing.

For a more complete understanding of the present invention, reference can be made to the detailed description which follows, and to the accompanying drawings.

In the drawings:

FIG. 1 is a view partly in section of a double three-way valve constructed in accordance with the principles of the invention;

FIG. 2 is a cross-sectional view taken along the line 2—2 in FIG. 1;

FIG. 3 is a perspective view of the movable valve element shown in the arrangement in FIG. 1; and FIG. 4 is a perspective view of a packing sleeve constructed in accordance with the invention.

Referring now to an illustrative embodiment of the invention as shown in the drawings, the numeral 10 refers to a housing which is relatively square in cross-section and of sufficient length to permit the location of spaced-apart threaded openings 11, 12, 13 and 14, to receive suitable fluid couplings, not shown. On the side of the housing 10 opposite from that viewed in FIG. 1, spaced-apart threaded openings 15 (FIG. 2) and 16 (not visible) are formed in the same circumferential plane with the openings 12 and 14, and 11 and 13, respectively. For convenience in the following description, the openings 12, 14, and 15 are associated with a first valve, and the openings 11, 13, and 16 are associated with a second valve in the illustrative double valve arrangement shown in the drawings.

A bore or channel 17 is formed axially through the housing 10, and a valve element 18 is positioned to be rotatable therein. Considering the first valve as identified above, an opening 19 communicates between the threaded opening 12 and the axial channel 17 and, similarly, an opening 21 communicates between the threaded opening 14 and the same axial channel 17. In addition, the openings 19 and 21 are in substantially axial alignment with each other. As seen in FIG. 2, a third opening 22 communicates between the threaded opening 15 and the axial channel 17. The axis of this opening 22 lies within the same plane as the axes of the openings 19 and 21.

The valve element 18 is provided with two slots 26, one of which is in the same plane as the axes of the three openings 19, 21 and 22. Thus, as seen in FIG. 2, by rotating the valve element 18, the slot 26 permits communication between selected openings, such as between the openings 19 and 22 in one position of the valve or as between the openings 21 and 22 in the position shown in FIG. 2.

Since the second valve embodying the openings 11, 13, and 16 is constructed in the same manner as the first valve described above, a further detailed description of the second valve is deemed to be unnecessary.

To provide an effective seal in accordance with the invention, identical sleeves 23 and 24 of suitable material having a relatively low coefficient of friction when in the dry state are positioned about the valve element 18 within the axial channel 17. These sealing sleeves are an important feature of the invention and are constructed of a material which has certain desired properties. The sleeve material is essentially a solid in the temperature ranges which are normally encountered, and also the material is substantially chemically inert to the fluids which are to be sealed off. Although essentially a solid, the sleeve 23 is yieldable or plastically deformable whereby an axial pressure against the ends of each sleeve will urge the sleeve into tight-sealing engagement between the valve element 18 and the axial channel 17. Furthermore, with a sleeve of this material it is not necessary to employ lubricants such as grease or oil to maintain the seal while permitting free movement of the valve element 18 within the sleeve.

It has been found that a material such as "Teflon" is particularly well suited for the sleeves described above. "Teflon" is a trademark applied to the polymers of tetrafluoroethylene. This material remains solid over an appreciably wide range of temperatures. However, it should be understood that the present invention is not limited to this particular material, any plastically deformable material having a relatively low coefficient of friction being suitable to substitute for "Teflon."

A significant feature of the invention is a structural arrangement whereby the plastically deformable sleeve functions more efficiently as a valve packing material. To assist in the accomplishment of this desired result, a groove 27, FIG. 4, is provided in each end of the sleeves. Threaded plugs 28 and 31 are adapted to fit within the threaded openings 29 and 32, respectively, in opposite ends of the axial channel 17. Each of these plugs 28 and 31 is provided with a circular portion extending ahead of each plug and formed to fit within the respective grooves 27 in each sleeve. By this arrangement, the two plugs 28 and 31 are tightened to apply an axial force on the sleeve.

A metallic sleeve 33 is interposed between the deformable sleeves 23 and 24. The opposite ends of the metallic sleeve 33 are formed to fit the respective grooves 27 in the deformable sleeves 23 and 24, as best seen in FIG. 1. Suitable pins 35 prevent relative movement between the adjacent sleeves, and a threaded bolt 36, which passes through the housing 10 and engages the metallic sleeve 33, prevents rotational movement of the valve packing assembly that is, the connected sleeves 23, 33 and 24. It is important to prevent rotation of these sleeves since each sleeve, for example sleeve 23, has openings 37 and 38, FIG. 4, for matching with the openings 19 and 22, respectively.

The housing 10 may be formed of any suitable material, and a specific example of a suitable material, for illustrative purposes, is anodized aluminum. The axial channel 17, in one embodiment of the assembly, measures ⅞ inch in diameter, and in this specific assembly, the "Teflon" sleeve is provided with a ⅞ inch outside diameter and a ⅝ inch inside diameter. The valve element 18 is formed of steel and measures ⅝ inch in diameter. Of course, it is understood that these particular dimensions are merely illustrative and are in no way limiting. Valve packing assemblies of any desired dimensions may be made in accordance with the principles of the invention, and the housing 10 may be formed to contain a single or multiple valve.

While there has been shown and described and pointed out the fundamental novel features of the invention as applied to a preferred embodiment, it will be understood that various omissions and substitutions and changes in the form and details of the assembly illustrated and in its operation may be made by those skilled in the art without departing from the spirit of the invention. It is the intention, therefore, to be limited only as indicated by the scope of the following claims.

I claim:

1. A sealed valve assembly comprising a valve housing, two sets of valve ports formed in the housing and spaced apart from each other, a movable actuator accommodated in the housing and having two spaced-apart valve passages formed therein which cooperate with the said ports, a pair of spaced-apart sealing sleeves surrounding each of said valve passages formed in the actuator and providing a low coefficient of friction, long life bearing for the actuator, each of said sealing sleeves being a relatively tough, slippery, semi-rigid, axially compressible, deformable, but nevertheless relatively resilient element, having passages formed therein in alignment with said ports, a stationary tube intermediate the spaced-apart sealing sleeves in edge-to-edge coaxial relationship with the sealing sleeves, said intermediate stationary tube surrounding the actuator but in out-of-contact relationship therewith, a pair of compression elements threadably coupled with the housing and operatively connected with the outer edges of the sealing sleeves so as to apply axial compression on the sleeves, thereby increasing the effectiveness of the sealing action between the surfaces of the valve actuator and the housing to be sealed, and means connecting the sealing sleeves and the intermediate stationary tube for preventing rotation of the sealing sleeves relative to the valve housing.

2. A sealed valve assembly as set forth in claim 1 in which the means for preventing rotation of each sealing sleeve includes connections between each of the sleeves and the intermediate stationary, rigid tube, and means connecting the intermediate stationary, rigid tube with the housing to prevent the rotation of the intermediate tube relative to the housing.

3. A valve assembly comprising a housing, a first opening therethrough along a predetermined axis, a valve element adapted to fit within said first opening, said housing having second and third openings along respective axes at substantially right angles to the axis of said first opening, means associated with each of said second and third openings for attaching a fluid coupling thereto, said valve element having means therein for communicating between said second opening and said third opening when in one position and to prevent communication between said second opening and said third opening when in another position, a deformable packing member positioned about said valve element to form a tight fit within said first opening, said deformable packing member having apertures radially therethrough for communicating with each of said second and third openings within said housing, said housing having fourth and fifth openings spaced apart from said second and third openings, means associated with each of said fourth and fifth openings for attaching a fluid coupling thereto, a second deformable packing member having apertures radially therethrough for communicating with each of said fourth and fifth openings, both of said first and second deformable packing members having a circumferential groove in each end thereof, an intermediate sleeve interposed between the two packing members, means on each end of said intermediate sleeve to be received by a circumferential groove in said first and second deformable packing members, means to affixedly attach each deformable packing member to said intermediate sleeve, bolt means threaded through said housing and in contact with said intermediate sleeve to prevent movement of said intermediate sleeve, and means to cooperate with the two packing members in the grooves furthermost from said intermediate sleeve to apply an axial force to said deformable packing members for providing an effective seal about said valve element and to, in combination with said bolt means, prevent movement of said two packing members.

References Cited in the file of this patent

UNITED STATES PATENTS

| 344,816 | Cole | July 6, 1886 |
| 827,803 | Jerov | Aug. 7, 1906 |
| 1,817,258 | Klinger | Aug. 4, 1931 |
| 2,063,699 | Schellin | Dec. 8, 1936 |
| 2,437,139 | Tucker | Mar. 2, 1948 |
| 2,625,413 | Christenson | Jan. 13, 1953 |
| 2,681,257 | Niesemann | June 15, 1954 |
| 2,694,413 | Force | Nov. 16, 1954 |

FOREIGN PATENTS

| 52,546 | Sweden | Aug. 23, 1922 |